(12) United States Patent
Kenington et al.

(10) Patent No.: US 9,213,079 B2
(45) Date of Patent: Dec. 15, 2015

(54) METHOD AND APPARATUS FOR GEOLOCATING A WIRELESS COMMUNICATION UNIT

(75) Inventors: Peter Kenington, Chepstow (GB); Nicholas James Randell, Alton (GB)

(73) Assignee: JDSU UK Limited, Berkshire (GB)

( * ) Notice: Subject to any disclaimer, the term of this patent is extended or adjusted under 35 U.S.C. 154(b) by 731 days.

(21) Appl. No.: 13/369,598

(22) Filed: Feb. 9, 2012

(65) Prior Publication Data

US 2013/0210450 A1 Aug. 15, 2013

(51) Int. Cl.
*H04W 24/00* (2009.01)
*G01S 5/02* (2010.01)

(52) U.S. Cl.
CPC *G01S 5/02* (2013.01); *G01S 5/0252* (2013.01)

(58) Field of Classification Search
CPC ......... G01S 5/02; G01S 5/0252; H04W 24/00
USPC ........................................ 455/456.1; 370/338
See application file for complete search history.

(56) References Cited

U.S. PATENT DOCUMENTS

| 8,874,133 | B2 | 10/2014 | Flanagan et al. | |
| 9,078,228 | B2 | 7/2015 | Flanagan | |
| 2007/0202887 | A1 | 8/2007 | Counts et al. | 455/456.1 |
| 2012/0036140 | A1* | 2/2012 | Nielsen et al. | 707/754 |

FOREIGN PATENT DOCUMENTS

| WO | 02/63329 | 8/2002 | ................ G01S 5/12 |
| WO | 2010083943 A1 | 7/2010 | |

OTHER PUBLICATIONS

EP Search Report for EP Appln No. 13154703 dated Dec. 18, 2014.
Extended European Search Report corresponding to EP 13 15 4703, mailed Jan. 8, 2015, 8 pages.

* cited by examiner

*Primary Examiner* — Marcos Batista
(74) *Attorney, Agent, or Firm* — Harrity & Harrity, LLP (57) ABSTRACT

A method for geolocating a wireless communication unit. The method comprises receiving measurement data for radio frequency (RF) signals between the wireless communication unit and at least one base transceiver station, calculating an RF measurement based geolocation estimate for the wireless communication unit based at least partly on the received RF signal measurement data, obtaining geographical area data for at least one wireless coverage area visible to the wireless communication unit, determining a geolocation validation area based at least partly on the obtained geographical area data for the at least one wireless coverage area visible to the wireless communication unit, and deriving a confidence factor for the RF measurement based geolocation estimate based at least partly on the determined geolocation validation area.

20 Claims, 4 Drawing Sheets

METHOD AND APPARATUS FOR GEOLOCATING A WIRELESS COMMUNICATION UNIT

FIELD OF THE INVENTION

The field of the invention relates to a method and apparatus for geolocating a wireless communication unit, and in particular to a method and apparatus for geolocating a wireless communication unit within a cellular communication network.

BACKGROUND OF THE INVENTION

Wireless communication systems, such as the $2^{nd}$ Generation (2G) (otherwise referred to as Global System for Mobile (GSM) communications) and the $3^{rd}$ Generation (3G) of mobile telephone standards and technology, are well known. An example of such 3G standards and technology is the Universal Mobile Telecommunications System (UMTS), developed by the $3^{rd}$ Generation Partnership Project (3GPP) (www.3gpp.org).

Typically, wireless communication units, or User Equipment (UE) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more base stations, each base station supporting one or more communication cells to which UEs may attach, and thereby connect to the network.

The practice of geolocation, in relation to such wireless communication systems, is the identification of a real-world geographical location of a wireless communication unit. Geolocation may be used for various different purposes ranging from, by way of example, enabling emergency services to determine the location of a caller during an emergency call, to enabling network coverage, quality of service and other similar wireless communication unit related data to be evaluated, etc.

A number of techniques for performing geolocation of wireless communication units in a wireless communication system have been developed. One such technique involves the installation of dedicated hardware at each base station site, as currently implemented for 'E911' emergency call location in the United States of America. Such a technique enables a high level of accuracy for geographically locating a wireless communication unit. However, the installation of such additional, dedicated hardware is expensive to implement.

Another technique uses GPS (Global Position Satellite) functionality built into wireless communication units. This technique also enables a high level of accuracy for geographically locating a wireless communication unit. However, this technique relies on the wireless communication unit being geolocated to have a GPS receiver, and for that GPS receiver to be turned on. Even if a GPS receiver is present, many users leave them turned off due to privacy concerns and/or to prolong battery life.

A further technique uses signal strength and timing data derived from the wireless communication unit itself, along with network configuration data provided by the network operator, to locate the wireless communication unit. One such technique is described in the applicants co-pending patent application WO2010/083943. Advantageously, this technique does not require additional dedicated hardware to be implemented within the network, nor does it require GPS functionality to be available within the wireless communication unit being located. However, a problem with such a technique is that it relies on signal strength and timing data provided by wireless communication units, which are consumer grade devices built to a budget, and which typically do not undergo regular calibration. Furthermore, such consumer units often experience rough treatment such as being dropped on hard surfaces etc. As such, the data received from wireless communication units can be unreliable, and may even be entirely inaccurate. A further problem with such a technique is that it relies on network configuration data provided by the network operator; such data sometimes being out of date or simply inaccurate.

Thus, there is a need for an improved method and apparatus for geolocating a wireless communication unit, whereby at least some of the above mentioned problems with known techniques are substantially alleviated.

SUMMARY OF THE INVENTION

Accordingly, the invention seeks to mitigate, alleviate or eliminate one or more of the abovementioned disadvantages singly or in any combination.

According to a first aspect of the invention, there is provided a method for geolocating a wireless communication unit. The method comprises receiving measurement data for radio frequency (RF) signals between the wireless communication unit and at least one base transceiver station, calculating an RF measurement based geolocation estimate for the wireless communication unit based at least partly on the received RF signal measurement data, obtaining geographical area data for at least one wireless coverage area visible to the wireless communication unit, determining a geolocation validation area based at least partly on the obtained geographical area data for the at least one wireless coverage area visible to the wireless communication unit, and deriving a confidence factor for the RF measurement based geolocation estimate based at least partly on the determined geolocation validation area.

In this manner, a method of geolocating a wireless communication unit is described that enables relatively low cost and relatively high precision geolocation techniques to be used to calculate RF measurement based geolocation estimates for wireless communication units, which advantageously also derives confidence factors for the potentially inaccurate RF measurement based geolocation estimates using relatively low precision, but relatively accurate coverage area data to determine a geolocation validation area.

In one optional embodiment of the invention, the method may comprise determining a geolocation validation area by calculating an area of overlap of coverage areas for the at least one wireless coverage area visible to the wireless communication unit.

In one optional embodiment of the invention, the method may further comprise refining a geolocation validation area using received RF signal measurement data for at least one wireless coverage area visible to the wireless communication unit.

In one optional embodiment of the invention, the method may comprise receiving signal strength information from the wireless communication unit for at least one wireless coverage area visible to the wireless communication unit, and refining the geolocation validation area based at least partly on the received signal strength information.

In one optional embodiment of the invention, the method may comprise receiving link quality information from the wireless communication unit for at least one wireless coverage area visible to the wireless communication unit, and refining the geolocation validation area based at least partly on the received link quality information.

In one optional embodiment of the invention, the method may further comprise receiving propagation delay information from the wireless communication unit for at least one wireless coverage area visible to the wireless communication unit, estimating a distance between the wireless communication unit and the at least one wireless coverage area visible to the wireless communication unit, and refining the geolocation validation area for the wireless communication unit within the area of overlap based at least partly on the estimated distance(s).

In one optional embodiment of the invention, the obtained geographical area data for the at least one wireless coverage area visible to the wireless communication unit may comprise, for each wireless coverage area, an indication of a geographical location representative of a central point within the wireless coverage area and an indication of a radius of the wireless coverage area.

In one optional embodiment of the invention, the geographical area data for the at least one wireless coverage area visible to the wireless communication unit may be obtained from at least one third party database. For example, the geographical area data for the at least one wireless coverage area visible to the wireless communication unit may be obtained from at least one of:
 at least one publicly available on-line database; and
 at least one proprietary third party database.

In one optional embodiment of the invention, the obtained geographical area data may comprise at least one from a group comprising at least one of:
 crowd-sourced coverage data;
 network planning/configuration data; and
 drive test data.

In one optional embodiment of the invention, the method may comprise calculating an RF measurement based geolocation estimate for the wireless communication unit by deriving a probability density function for a location of the wireless communication unit from the received RF signal measurement data and network configuration data.

In one optional embodiment of the invention, the received RF signal measurement data may comprise at least one from a group comprising at least one of:
 signal strength measurement data;
 link quality measurement data; and
 propagation delay measurement data.

In one optional embodiment of the invention, the method may comprise setting the confidence factor to comprise a lower confidence value if the RF measurement based geolocation estimate is located outside the geolocation validation area, and setting the confidence factor to comprise a higher confidence value if the RF measurement based geolocation estimate is located inside the geolocation validation area.

In one optional embodiment of the invention, if the RF measurement based geolocation estimate is located outside the geolocation validation area, the further from the geolocation validation area the RF measurement based geolocation estimate is located, the lower the confidence value may be set for the confidence factor.

In one optional embodiment of the invention, the method may further comprise providing to a user an indication of the derived confidence factor for the RF measurement based geolocation estimate.

In one optional embodiment of the invention, if the derived confidence factor for the RF measurement based geolocation estimate comprises a confidence value below a predetermined confidence level, the method may further comprise performing at least one of:
 discarding the RF measurement based geolocation estimate; and
 calculating a replacement geolocation estimate for the wireless communication unit based at least partly on the geolocation validation area.

In one optional embodiment of the invention, the method may comprise receiving
RF signal measurement data from the wireless communication unit as part of a periodic measurement reporting process.

According to a second aspect of the invention, there is provided a geolocation system arranged to perform geolocation of a wireless communication unit. The geolocation system comprises at least one signal processing module arranged to perform the method of the first aspect of the invention.

According to a third aspect of the invention, there is provided a cellular communication system incorporating the geolocation system of the second aspect of the invention.

According to a fourth aspect of the invention, there is provided a non-transitory computer program product having computer-readable code stored thereon for programming a signal processing module to perform a method for geolocating a wireless communication unit. The code is operable for performing the method of the first aspect of the invention.

These and other aspects, features and advantages of the invention will be apparent from, and elucidated with reference to, the embodiments described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS
OF THE INVENTION

Examples of the invention will be described in terms of a method and apparatus for geolocating a wireless communication unit within a Universal Mobile Telecommunications System (UMTS™) cellular communication network. However, it will be appreciated by a skilled artisan that the inventive concept herein described may equally be implemented within cellular communication networks adapted in accordance with alternative wireless communication technologies and standards.

In a number of applications, the adaptation of a geolocation system in accordance with examples of the invention effectively performs a method for geolocating a wireless communication unit. The method comprises receiving measurement data for radio frequency (RF) signals between the wireless communication unit and at least one base transceiver station, calculating an RF measurement based geolocation estimate for the wireless communication unit based at least partly on the received RF signal measurement data, obtaining geographical area data for at least one wireless coverage area visible to the wireless communication unit, determining a geolocation validation area based at least partly on the obtained geographical area data for the at least one wireless coverage area visible to the wireless communication unit, and deriving a confidence factor for the RF measurement based geolocation estimate based at least partly on the determined geolocation validation area.

In this manner, and as described in greater detail below, a geolocation system is described that enables relatively low cost and relatively high precision geolocation techniques to be used to calculate RF measurement based geolocation estimates for wireless communication units, which advantageously also derives confidence factors for the potentially inaccurate RF measurement based geolocation estimates using relatively low precision, but relatively accurate coverage area data to determine a geolocation validation area.

Figure 1:
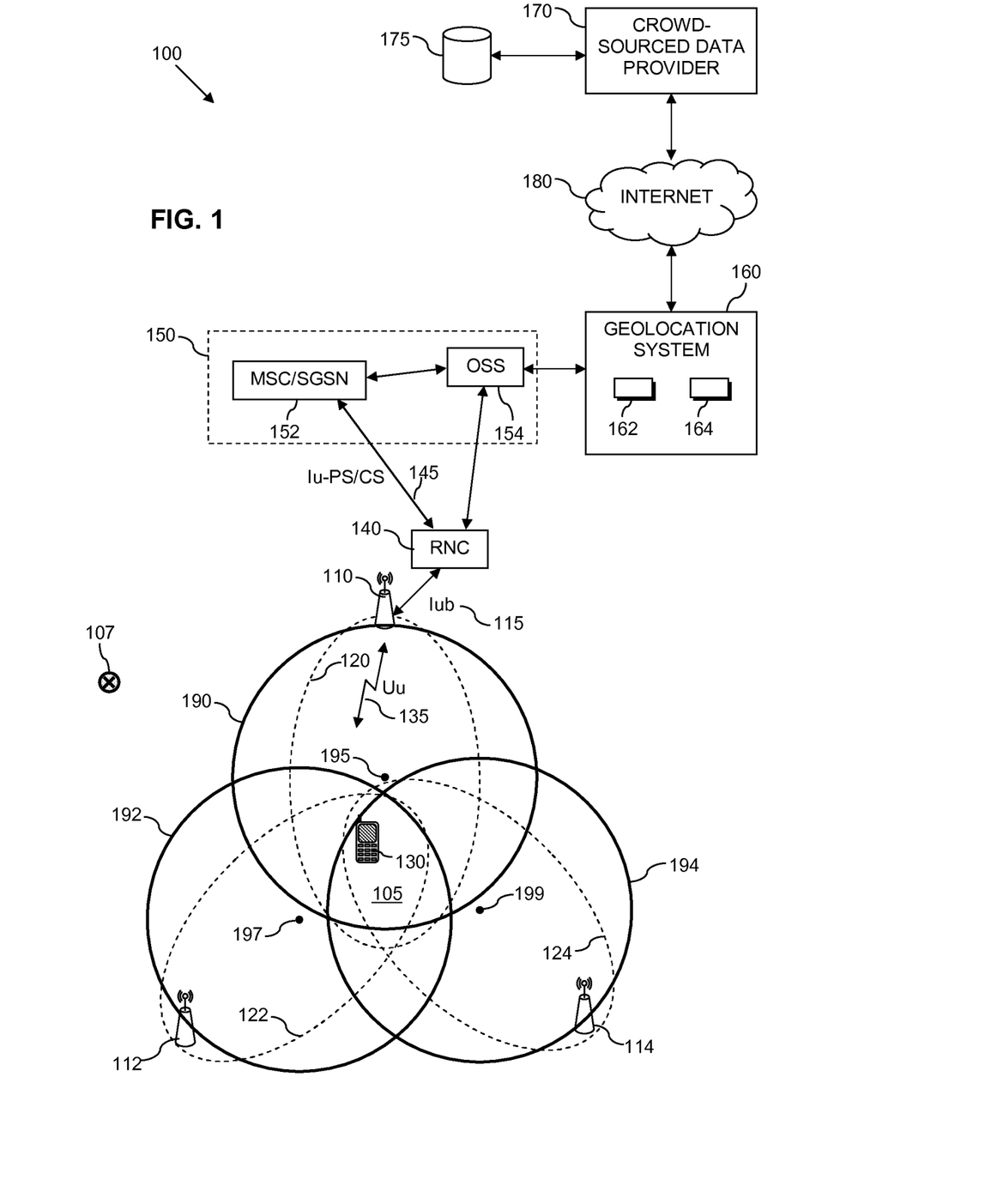
FIG. 1 illustrates an example of a simplified block diagram of a part of a cellular communication network.

Referring now to the drawings, and in particular FIG. 1, an example of a simplified block diagram of a part of a cellular communication network is illustrated and indicated generally at 100. In FIG. 1, there is illustrated an example of a communication system in a form of a third generation partnership project (3GPP™) UMTS™ network 100 that comprises a plurality base stations, such as those illustrated at 110, 112, 114. Each base station 110, 112, 114 is arranged to support one or more communication sectors, also known as cells, such as illustrated at 120, 122, 124. In a typical UMTS network, there may exist a mix of macro, micro and femto cells comprising sectors of a range of different sizes. As such, it will be appreciated that the base stations 110, 112, 114 may comprise a mix of NodeBs and Home NodeBs (also known as femto access points). A wireless communication unit 130 located within a cell 120, 122, 124 is able to communicate with the base station 110, 112, 114 supporting that cell via an air interface (Uu) 135. Each base station 110, 112, 114 is operably coupled to a controller, such as the radio network controller (RNC) 140 to which the base station 110 is operably coupled via an Iub interface 115. The RNC 140 is operably coupled to a core network 150 via an Iu-PS interface and/or an Iu-CS interface, as illustrated generally at 145. The core network 150 may comprise various network elements such as, in the illustrated example, one or more mobile switching centres (MSC) and/or Serving GPRS (General Packet Radio Service) Support Nodes (SGSN) 152 to which controllers such as the RNC 140 are operably coupled. The core network 150 in the illustrated example further comprises an operations support system (OSS) 154. The OSS 154 may be arranged to provide services such as maintaining network inventory, provisioning services, network component configuration, fault management, etc, and in the illustrated example is operably coupled to core network elements such as the MSC/SGSN, as well as to RNCs 140, for example by way of high speed network connections, such as Gigabit Ethernet connections or the like.

A geolocation system 160 is arranged to perform geolocation of wireless communication units within the UMTS network 100, and in the illustrated example is operably coupled to the OSS 160. Such a geolocation system 150 may comprise an external system managed by a third party independent from the network operator responsible for the UMTS network 100. However, it is also contemplated that such a geolocation system 150 may comprise an integral part of the UMTS network 100, and thus be managed by the network operator. Accordingly, in some examples, the geolocation system 160 may form an integral part of, for example, the OSS 154.

In accordance with some example embodiments of the present invention, the geolocation system 160 is arranged to perform geolocation of wireless communication units within the cellular communication network 100. The geolocation system 160 comprises one or more signal processing modules, such as the signal processing module illustrated generally at 162, arranged to a method for geolocating a wireless communication unit. In particular, the signal processing module 162 of the geolocation system 160 of the illustrated example is arranged to receive measurement data for radio frequency (RF) signals between a wireless communication unit, such as the wireless communication unit 130, and at least one of the base transceiver station 110, 112, 114, calculate an RF measurement based geolocation estimate for the wireless communication unit 130 based at least partly on the received RF signal measurement data, obtain geographical area data for at least one wireless coverage area 120, 122, 124 visible to the wireless communication unit 130, determine a geolocation validation area based at least partly on the obtained geographical area data, and derive a confidence factor for the RF measurement based geolocation estimate based at least partly on the determined geolocation validation area. For example, the signal processing module 162 may be arranged to execute computer readable code stored within a memory element 164 arranged to program the signal processing module to perform a method for geolocating a wireless communication unit as herein described.

Within a UMTS network a wireless communication unit, such as the wireless communication unit 130 of FIG. 1, is typically configured to send measurement reports to, in the case of a macro cell architecture, the RNC 140 of the serving base station, for example base station 110, for cells included in an active set (i.e. those cells to which the wireless communication unit is currently connected) and cells included in a monitored set (i.e. those cells within a CELL_INFO_LIST broadcast by the network, not included in the active set). The wireless communication unit 130 may also be configured to send intra-frequency measurement reports for cells included in a detected set (i.e. those cells detected by the wireless communication unit but not included in the active or monitored sets). Such measurement reporting often forms part of a cell selection/reselection process, and may be periodic and/or event triggered.

Measurement reports sent from the wireless communication unit 130 to the RNC 140 may comprise measurement data for RF signals between the respective wireless communication unit 130 and one or more base transceiver stations 110, 112, 114. Such measurement data may comprise measurements of link quality, signal strength, propagation delay, etc. for specific cells 120, 122, 124 identified therein. The information contained within the measurement reports, including the location area codes and cell identifiers for the respective cells, may be provided by the receiving RNC 140 to, in the illustrated example, the OSS 154, from where it may be made available to external systems, such as the geolocation system 160.

Thus, it is contemplated that the geolocation system 160 may receive such measurement data for RF signals from the OSS 154, provided by the wireless communication unit 130 as part of a measurement reporting procedure; such data comprising one or more of signal strength measurement data, link quality measurement data, and/or propagation delay measurement data. Advantageously, by utilising such measurement reports to provide measurement data for RF signals, no additional air interface bandwidth is required.

Having received the measurement data for RF signals between the wireless communication unit 130 and one or more base transceiver stations 110, 112, 114, the geolocation system 160 may then calculate an RF measurement based geolocation estimate for the wireless communication unit 130 based on such RF signal measurement data. For example, the received measurement data derived from the wireless communication unit 130 itself may be used along with network configuration data provided by a network operator to determine a geolocation estimate by deriving a probability density function for a location of the wireless communication unit 130 based on the received RF signal measurement data and network configuration data. Such a technique for calculating a geolocation estimate is described in the applicant's co-pending patent application WO2010/083943, which is incorporated in its entirety herein by reference.

It will be appreciated that the present invention is not limited to the specific technique for calculating an RF measurement based geolocation estimate as described in the applicants co-pending patent application WO2010/083943, and it is contemplated that any suitable alternative technique may equally be implemented.

For example, an RF measurement based geolocation estimate may additionally/alternatively be calculated based on, say, a signal power difference for signals received by the wireless communication unit 130 from at least two network nodes, and a signal propagation model describing the propagation of wireless signals throughout one or more geographical areas of the cellular communication network 100. Such a technique for calculating a geolocation estimate is described in the applicant's co-pending U.S. patent application Ser. No. 13/311,132, filed Dec. 5, 2011, entitled "SYSTEM AND METHODS OF MOBILE GEOLOCATION", which is incorporated in its entirety herein by reference.

In some examples, an RF measurement based geolocation estimate may additionally/alternatively be calculated based on contextual information and contextual reference signatures. For example, such contextual information and corresponding contextual reference signatures may comprise control information other than RF measurement based information. Such a technique for calculating a geolocation estimate is described in applicant's U.S. patent application Ser. No. 13/369,591, now U.S. Pat. No. 9,078,228, entitled "MOBILE GEOLOCATION", and which is incorporated in its entirety herein by reference.

Advantageously, such techniques do not require additional dedicated hardware to be implemented within the network, nor do they require GPS (Global Positioning Satellite) functionality to be available within the wireless communication unit 130. Additionally, such techniques enable a relatively high level of precision with which a wireless communication unit may be geolocated; i.e. such techniques enable a wireless communication unit to be geolocated to within a relatively small area. However, a problem with such techniques is that they rely on measurement data provided by wireless communication units, which are consumer grade devices built to a budget, and which typically do not undergo regular calibration. Furthermore, such consumer units often experience rough treatment such as being dropped on hard surfaces etc. As such, the data received from wireless communication units can be unreliable, and may even be entirely inaccurate. Additionally, such techniques rely on network configuration data provided by the network operator; such data sometimes being out of date or simply inaccurate.

Thus, an RF measurement based geolocation estimate for the wireless communication unit 130 calculated by the geolocation system 160 based on such RF signal measurement data, and also typically further based on network configuration data, may be considered as being relatively high precision, but potentially inaccurate.

Accordingly, the geolocation system 160 is further arranged to obtain geographical area data for one or more wireless coverage areas visible to the wireless communication unit 130, such as cells 120, 122, 124. For example, and as mentioned above, the information contained within the measurement reports sent by a wireless communication unit to the network include the location area codes and cell identifiers for the respective cells. Thus, the location area codes and cell identifiers for the visible cells (wireless coverage areas) included within the measurement reports provided to the RNC 140 enable the respective (visible) wireless coverage areas 120, 122, 124 to be identified. Advantageously, by utilising such measurement reports to enable wireless coverage areas 120, 122, 124 visible to the wireless communication unit 130 to be identified, no additional air interface bandwidth is required.

Thus, when the geolocation system 160 is required to obtain geographical area data for one or more wireless coverage areas 120, 122, 124 visible to the wireless communication unit 130, the geolocation system 160 may receive identifiers of cells visible to the wireless communication unit 130 from the OSS 154, based on information provided by way of measurement reports received from the wireless communication unit 130. The geolocation system 160 may then obtain geographical area data for the identified wireless coverage areas 120, 122, 124.

It is contemplated that the wireless coverage areas 120, 122, 124 for which geographical area data is obtained and used to determine a geolocation validation area as described below, need not necessarily correspond to the base transceiver stations for which RF measurement data from the wireless communication unit 130 is received. For example, consider the set of base transceiver stations for which RF measurement data from the wireless communication unit 130 is received as a 'first' set of base transceiver stations, and a set of base transceiver stations corresponding to wireless coverage areas for which geographical area data is obtained as a 'second' set of base transceiver stations. The second set of base transceiver stations may comprise a subset of the first set of base transceiver station. For example, such a subset may comprise, say, n base transceiver stations within the first set of base transceiver stations having the highest signal strength and/or the highest link quality and/or the shortest propagation delay. Alternatively, such a subset may comprise those base transceiver stations within the first set having signal strength and/or link quality and/or propagation delay measurements above/below a defined threshold. However, it is further contemplated that the second set of base transceiver stations may additionally/alternatively comprise base transceiver stations not within the first set of base transceiver stations for which RF measurement data from the wireless communication unit 130 is received. For example, whilst the first set of base transceiver stations may comprise base transceiver stations forming part of the cellular communication network 100, one or more of the base transceiver stations within the second set of base transceiver stations corresponding to one or more wireless coverage areas for which geographical area data is obtained may be independent from the cellular communication network 100; for example one or more of the base transceiver stations within the second set may comprise, say, wireless local area network (WLAN) base transceiver stations, or the like.

Furthermore, it is also possible that the wireless communication unit 130 may not be able to connect to one or more nearby base transceiver stations within the cellular communication network 100, from a signal strength and/or link quality and/or propagation delay measurement perspective, due to those base transceiver stations already being 'fully loaded' and unable to handle any more traffic or connected devices. As such, the wireless coverage areas 120, 122, 124 for which geographical area data is obtained and used to determine a geolocation validation area as described below, need not necessarily correspond to nearest or 'best' base transceiver station. In addition, it is possible that, due to errors or omissions within neighbour cell lists or the like, a nearby or 'strong' coverage area may be overlooked.

Having identified the set of wireless coverage areas visible to the wireless communication unit 130, such as wireless coverage areas 120, 122, 124 wireless coverage areas 120, 122, 124 in the illustrated example, the geolocation system 160 may then obtain geographical area data for the identified wireless coverage areas. For example, crowd sourcing (the act of sourcing tasks to a large group of people or community (crowd)) has been used by various companies to build up location databases relating to, as an example, wireless coverage areas (e.g. cells, WLAN 'hotspots', etc.). Data obtained from large numbers of users of, for example, GPS enabled wireless communication units over an extended period of time enables wireless coverage areas to be associated with accurate geographical location data. For example, geographical location data obtained from a GPS enabled wireless communication unit may be associated with, for example, one or more identifiers (e.g. a location area code and cell identifiers for a UMTS cell, or a service set identifier—SSID in the case of a wireless local area network (WLAN)) representing wireless coverage areas to which the GPS enabled wireless communication unit is connected to, or which are visible to the GPS enabled wireless communication unit. Data obtained from large numbers of users of such units over an extended period of time may then be summarised to provide approximate geographical location data for each wireless coverage area for which data was received. For example, the geographical data associated with a particular wireless coverage area may be used to determine a geographical area for that particular wireless coverage area. The determined geographical area may then be represented by way of, for example, a centroid and radius therefor.

Such crowd-sourced data may be available from a number of sources, such as one or more third party databases, for example relevant databases maintained by Google™ Microsoft™ and Apple™, each of whom currently performs such crowd sourcing of location data. Such $3^{rd}$ party databases may be publicly accessible via, for example, the Internet. Alternatively, such databases may be proprietary and only available through subscription or some other arrangement with the proprietor thereof. For the illustrated example, the geolocation system 160 is illustrated as obtaining crowd-sourced geographical data from an on-line provider 170, over the Internet 180. For example, the geolocation system 160 may send a request to the on-line provider 170, via the Internet 180, for crowd-sourced geographical data for one or more identified wireless coverage areas; for example such a request comprising the location area code and cell identifier for the, or each, identified cell. Upon receipt of such a request, the crowd-sourced data provider 170 may retrieve the requested data from a database 175 and return the retrieved data to the geolocation system 160.

Having obtained the crowd-sourced geographical data for the identified wireless coverage areas visible to the wireless communication unit 130, the geolocation system 160 may then determine a geolocation validation area based on the obtained crowd-sourced geographical data. For example, the geolocation system 160 may estimate an area of overlap of the identified wireless coverage areas based on the received crowd-sourced data. For example, the wireless communication unit 130 of FIG. 1 is able to 'see' the cells 120, 122, 124 supported by each of the base stations 110, 112, 114. Accordingly, the wireless communication unit 130, which in the illustrated example is camped on the cell 120 supported by base station 110, sends measurement reports to the RNC 140 for each of the cells 120, 122, 124. Accordingly, the geolocation system 160 may obtain crowd-sourced geographical data from the crowd-sourced data provider 170 for the cells 120, 122, 124. The crowd-sourced geographical data may comprise, for each cell 120, 122, 124, an indication of a geographical location representative of a central point within the cell 120, 122, 124, such as the centroid therefor, illustrated at 195, 197, 199. The crowd-sourced geographical data may further comprise, for each cell 120, 122, 124, an indication of a radius of the cell 120, 122, 124. Thus, for the illustrated example a substantially circular geographical area 190, 192, 194 may be defined for each cell 120, 122, 124 using the obtained crowd-sourced geographical data. It will be appreciated that the crowd-sourced data may comprise data defining the general geographical coverage area of cells in alternative formats, for example in the form of longitude and latitude co-ordinates of a number of points defining an approximate area of coverage. Accordingly, the geographical area defined by the crowd-sourced data for a cell may be other than generally circular.

An area of overlap of the identified wireless coverage areas (i.e. of the cells 120, 122, 124) may then be estimated by calculating an area of overlap for the geographical areas 190, 192, 194 defined by the crowd-sourced geographical data. This area of overlap, illustrated generally at 105, may then be determined as the geolocation validation area for the wireless communication unit 130.

Advantageously, because such crowd-sourced data is typically based on a large amount of collated data based on, for example, GPS data, the crowd-sourced geographical data for each wireless coverage area upon which a geolocation estimate is based is typically reliable and accurate. Furthermore, such data is typically continuously updated, thereby ensuring the reliability and accuracy is maintained. Thus, such crowd-sourced geographical data may be considered as being relatively low precision, but relatively accurate.

In addition, although the crowd-sourced geographical data for each wireless coverage area may be accurate with regard to, for example, the centroid and radius therefor; the granularity available for each individual wireless coverage area is limited to the radius therefor, and thus is relatively coarse. However, by calculating a geolocation estimate for the wireless communication unit based on the obtained crowd-sourced geographical data for two or more identified wireless coverage areas, a finer granularity may be achieved.

It will be appreciated that the present invention is not limited to the use of crowd-sourced data for providing the geographical area data with which a geolocation validation area for the wireless communication unit may be determined, and it is contemplated that any suitable geographical area data may additionally/alternatively be used. For example, such an alternative source of geographical area data for base transceiver stations may comprise network planning/configuration data available from the network operator, or alternatively from a public database containing such location information, such as that maintained by OFCOM (Office of Communications) in the UK. Alternatively, geographical area data for base transceiver stations may be obtained via drive tests data.

Once the geolocation system 160 has determined the geolocation validation area for the wireless communication unit 130, the geolocation system 160 may then derive a confidence factor for the RF measurement based estimate using the geolocation validation area. For example, in the example illustrated in FIG. 1, if the RF measurement based geolocation estimate locates the wireless communication unit 130 at the location indicated generally at 107, because this location is outside of the geolocation validation area 105, a lower confidence factor for the RF measurement based estimate may be derived since it would suggest that the RF measurement based geolocation estimate is incorrect. Such an incorrect geolocation estimate may be a result of, for example, inaccurate measurement data provided by the wireless communication unit and/or inaccurate network configuration data used in the calculation of the RF measurement based geolocation estimate. Conversely, if the RF measurement based geolocation estimate locates the wireless communication unit 130 within the geolocation validation area 105, a higher confidence factor for the RF measurement based estimate may be derived since it would suggest that the RF measurement based geolocation estimate is likely to be correct.

In some example embodiments of the present invention, if the RF measurement based geolocation estimate is located outside the geolocation validation area 105, the geolocation system 160 may be arranged to derive a confidence factor according to a distance from the RF measurement based geolocation estimate to the geolocation validation area 105. Thus, if the RF measurement based geolocation estimate is located outside the geolocation validation area 105, the further from the geolocation validation area 105 the RF measurement based geolocation estimate is located, the lower a value set for the confidence factor.

An indication of the derived confidence factor for the RF measurement based geolocation estimate may then be provided to a user, for example via a user interface (not shown) of the geolocation system 160, in order to enable the user to, for example, evaluate the potential reliability of the RF measurement based geolocation.

Additionally/alternatively, the geolocation system 160 may be arranged to discard the RF measurement based geolocation estimate, if the derived confidence factor for the RF measurement based geolocation estimate comprises a confidence value below a predetermined confidence level.

Additionally/alternatively, the geolocation system 160 may be arranged to calculate a replacement geolocation estimate for the wireless communication unit 130 based on the geolocation validation area 105, if the derived confidence factor for the RF measurement based geolocation estimate comprises a confidence value below a predetermined confidence level. For example, the geolocation system 160 may be arranged to determine a replacement geolocation estimate for the wireless communication unit 130 by calculating a central point of the geolocation validation area 105, and setting this central point as the replacement geolocation estimate for the wireless communication unit 130. Conversely, the geolocation system 160 may be arranged to select a substantially arbitrary point within the geolocation validation area 105 and to set this selected point as the replacement geolocation estimate for the wireless communication unit 130. Advantageously, using an arbitrary point within the geolocation validation area 105 as the geolocation estimate for the wireless communication unit 130 enables a more even spread of geolocation estimates within their respective geolocation validation areas 105 when accumulating a plurality of replacement geolocation estimates. For example, a point within the geolocation validation area 105 may be selected using, say, a monte carlo algorithm.

In accordance with some alternative embodiments of the present invention, the geolocation system 160 may further be arranged to refine the geolocation validation area 105 based on, for example, measurements for the wireless coverage areas visible to the wireless communication unit 130. For example, as mentioned above, in a UMTS network the wireless communication unit 130 is arranged to send measurement reports to the RNC 140 of the serving base station 110 for cells within at least a monitored set and an active set of cells. Measurement reports sent from the wireless communication unit 130 to the RNC 140 may comprise measurements of link quality, signal strength, propagation delay, etc. for specific cells 120, 122, 124 identified therein. Accordingly, it is contemplated that such measurements may be used to refine the geolocation validation area 105 for the wireless communication unit 130.

Figure 2:
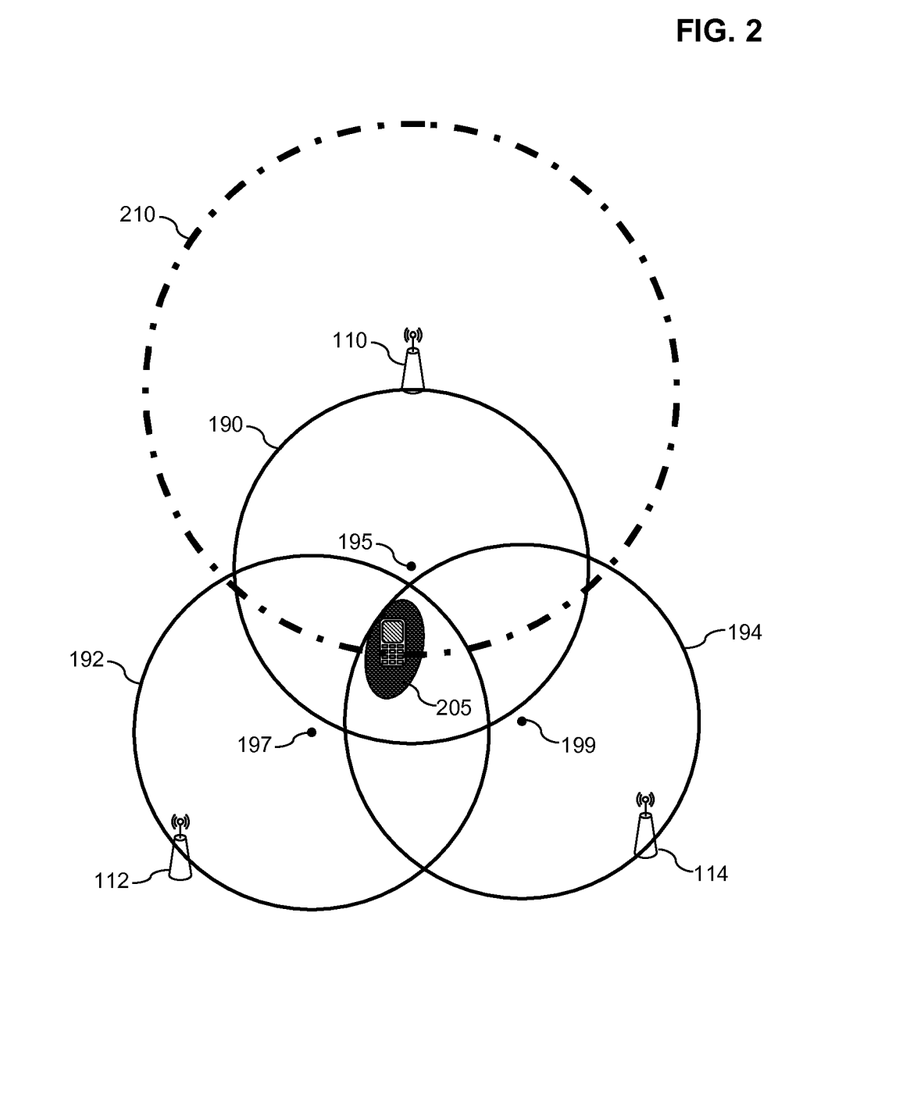
FIG. 2 illustrates a simplified diagram of an example of refining a geolocation validation area.

FIG. 2 illustrates a simplified diagram of an example of refining a geolocation validation area 105 for the wireless communication unit 130 using such measurements for the wireless coverage areas visible to the wireless communication unit 130. For example, the geolocation system 160 may further be arranged to refine the geolocation validation area 105 for the wireless communication unit 130 based at least partly on signal strength measurements for one or more of the wireless coverage areas. Specifically, a high signal strength reported from the wireless communication unit 130 for a given coverage area may be interpreted as the wireless communication unit 130 being located closer to the base station for that coverage are than would a lower reported signal strength. If the location of the base station itself is known, for example by way of network configuration data available from the network operator, or alternatively from a public database containing such location information, such as that maintained by OFCOM (Office of Communications) in the UK, then by comparing the signal strengths for the identified wireless coverage areas, and the locations of their respective base stations, an approximate location of the wireless communication unit 130 within the geolocation area 105 may be calculated, and used to refine the geolocation validation area 105 to comprise a smaller area, such as illustrated at 205.

Additionally/alternatively, the geolocation system 160 may further be arranged to refine the geolocation validation area 105 for the wireless communication unit 130 based at least partly on link quality measurements for one or more of the wireless coverage areas. For example, in a similar manner to the signal strength example outlined above, a link quality measurement, such as Ec/N0 in the case of a UMTS system, may be used to estimate how close to the respective base station 110, 112, 114 the wireless communication unit 130 is likely to be; a better (higher) Ec/N0 figure indicating that the wireless communication unit 130 is likely to be closer to a base station than for a poorer (lower) figure. Accordingly, if the location of the base station itself is known, for example by way of network configuration data available from the network operator, or alternatively from a public database containing such location information, then by comparing the link quality measurements for the identified wireless coverage areas, and the locations of their respective base stations, an approximate location of the wireless communication unit 130 within the geolocation validation area 105 may be calculated, and used to (further) refine the geolocation validation area 105 to comprise a smaller area 205.

Additionally/alternatively, the geolocation system 160 may further be arranged to refine the geolocation validation area 105 for the wireless communication unit 130 based at least partly on propagation delay measurements for one or more of the wireless coverage areas. For example, the propagation delay reported by the wireless communication unit 130 for a given wireless coverage area is a direct indication of how far the wireless communication unit 130 is from the transmitter (e.g. base station) for that wireless coverage area; the longer the propagation delay, the further from the base station the wireless communication unit is located. Radio signals travel at the speed of light ( $C\sim3\times10^8$ m/s), hence every microsecond of reported propagation delay corresponds to approximately 300 m of distance from the respective base station, or 150 m if the propagation delay reported is the 'round-trip' propagation delay, i.e. the delay in a signal getting from the wireless communication unit 130 to the base station and a response returning to the wireless communication unit 130 (ignoring any processing delay at the base station). Accordingly, if the location of the base station itself is known, for example by way of network configuration data available from the network operator, or alternatively from a public database containing such location information, the approximate distance from the base station to the wireless communication unit 130 can be used to further refine the geolocation validation area 105 for that wireless communication unit 130. For example, as illustrated in FIG. 2, using the propagation delay measurements provided by the wireless communication unit 130 for the base station 110, an approximate distance between the base station 110 and the wireless communication unit 130 may be calculated, as illustrated generally by the circle 210. A (further) refined geolocation validation area 105 may thus be derived by limiting the geolocation validation area 105 to within a limited distance of this circle 210 representative of the distance between the wireless communication unit 130 and the base station 110.

For the examples herein before described with reference to FIGS. 1 and 2, the present invention has been described using wireless coverage areas comprising cells or sectors within a cellular communication network, such as a UMTS network, and using RF measurement data for signals transmitted between the wireless communication unit 130 and base transceiver stations comprising UMTS NodeBs to calculate the RF measurement based geolocation estimate. However, it is contemplated that the RF measurement data for signals transmitted between the wireless communication unit 130 and alternative types of base transceiver station may equally be used to calculate the RF measurement based geolocation estimate. For example, RF measurement data for signals transmitted between the wireless communication unit 130 and base transceiver stations adapted for alternative radio access network technologies may be used for calculating the RF measurement based geolocation estimate, such as GSM (Global System for Mobile Communications), LTE/4G (Long Term Evolution/Fourth Generation) base transceiver stations.

Additionally/alternatively, many wireless communication units adapted for use with, for example, UMTS networks, are also adapted to connect to wireless local area network (WLAN) cells, also known as 'Wifi hotspots'. Accordingly, it is contemplated that RF measurement data for signals transmitted between the wireless communication unit 130 and WLAN base transceiver stations may additionally/alternatively be used to calculate the RF measurement based geolocation estimate. Notably, the locations of such 'hot spots' are often available on public databases for other purposes, for example to allow potential users of such 'hot spots' to be able to locate them.

Thus, a geolocation system 160 has been described that enables relatively low cost and relatively high precision geolocation techniques to be used to calculate RF measurement based geolocation estimates for wireless communication units, which advantageously also derives confidence factors for the potentially inaccurate RF measurement based geolocation estimates using relatively low precision, but relatively accurate coverage area data, such as crowd-sourced data, to determine a geolocation validation area. In this manner, such confidence factors may be indicated to a user to enable a user to, for example, evaluate the potential reliability of the RF measurement based geolocation. Additionally/alternatively, such confidence factors may be used to dynamically manage RF measurement based geolocation estimates for which low confidence factors are derived. For example, such low confidence factor RF measurement based geolocation estimates may be discarded, and replacement geolocation estimates may be generated using the based on the coverage area data, for example using the geolocation validation area 105.

Figure 3:
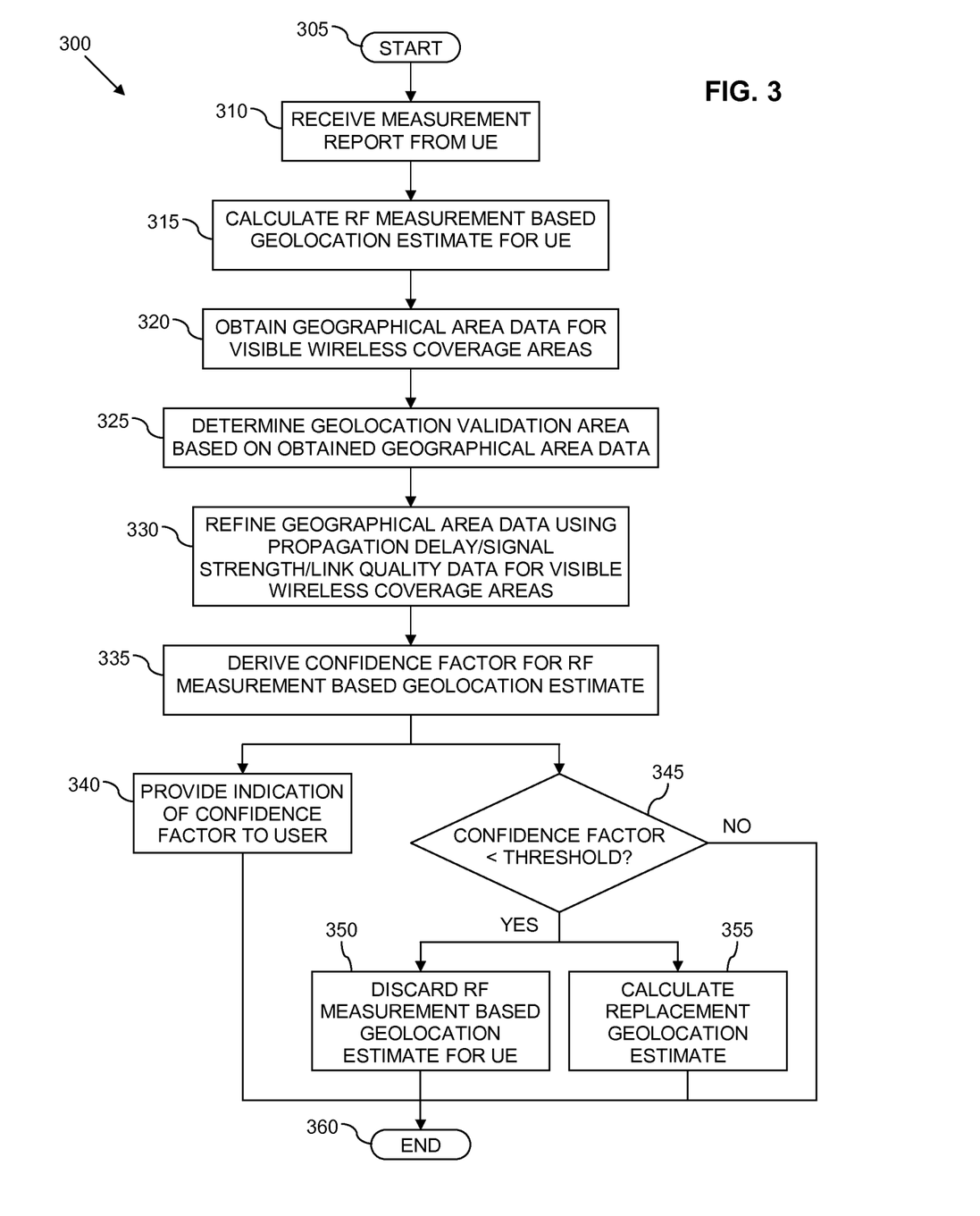
FIG. 3 illustrates simplified flowchart of an example of a method for geolocating a wireless communication unit.

Referring now to FIG. 3, there is illustrated a simplified flowchart 300 of an example of a method for geolocating a wireless communication unit, such as may be implemented within the geolocation system 160 of FIG. 1. The method starts at 305 and moves on to 310 measurement data for RF signals between the wireless communication unit and at least one base transceiver station are received, which for the illustrated example comprises receiving one or more measurement reports from the wireless communication unit (or UE in 3G parlance). Next, at 315, an RF measurement based geolocation estimate for the wireless communication unit is calculated, for example using a technique described in the applicants' co-pending patent application WO2010/083943. Geographical area data is then obtained for at least one wireless coverage area visible to the wireless communication unit at 320, and a geolocation validation area is determined based at least partly on the obtained geographical area data at 325. For the illustrated example, the geographical validation area is then refined using, for example, propagation delay data and/or signal strength data and/or link quality data for one or more of the wireless coverage areas visible to the wireless communication unit, at 330. Next, at 335, a confidence factor for the RF measurement based geolocation estimate is derived based on the (refined) geographical validation area. An indication of the confidence factor may then be provided to a user, as illustrated at 340. Additionally/alternatively, if the confidence factor is less than a predetermined confidence threshold level (at 345), for example indicating that the RF measure based geolocation estimate may be incorrect, the RF measurement based geolocation estimate may be discarded, as illustrated at 350. Additionally/alternatively, if the confidence factor is less than the threshold value (at 345), a replacement geolocation estimate may be calculated based on the geolocation validation area. The method then ends at 360.

Figure 4:
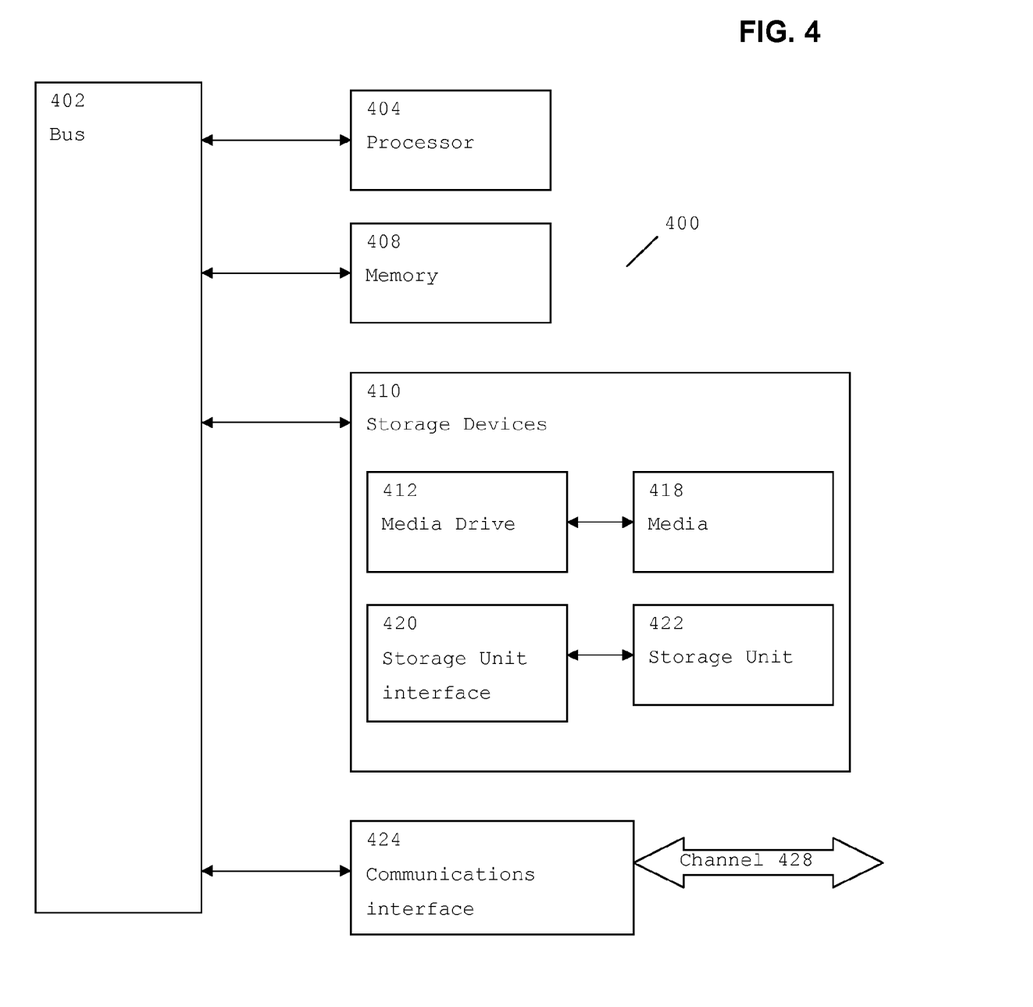
FIG. 4 illustrates a typical computing system that may be employed to implement processing functionality in embodiments of the invention.

Referring now to FIG. 4, there is illustrated a typical computing system 400 that may be employed to implement signal processing functionality in embodiments of the invention. For example, a computing system of this type may be used within the geolocation system 160 of FIG. 1. Those skilled in the relevant art will also recognize how to implement the invention using other computer systems or architectures. Computing system 400 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 400 can include one or more processors, such as a processor 404. Processor 404 can be implemented using a general or special-purpose processing engine such as, for example, a microprocessor, microcontroller or other control module. In this example, processor 404 is connected to a bus 402 or other communications medium.

Computing system 400 can also include a main memory 408, such as random access memory (RAM) or other dynamic memory, for storing information and instructions to be executed by processor 404. Main memory 408 also may be used for storing temporary variables or other intermediate information during execution of instructions to be executed by processor 404. Computing system 400 may likewise include a read only memory (ROM) or other static storage device coupled to bus 402 for storing static information and instructions for processor 404.

The computing system 400 may also include information storage system 410, which may include, for example, a media drive 412 and a removable storage interface 420. The media drive 412 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 418 may include, for example, a hard disk, floppy disk, magnetic tape, optical disk, CD or DVD, or other fixed or removable medium that is read by and written to by media drive 412. As these examples illustrate, the storage media 418 may include a computer-readable storage medium having particular computer software or data stored therein.

In alternative embodiments, information storage system 410 may include other similar components for allowing computer programs or other instructions or data to be loaded into computing system 400. Such components may include, for example, a removable storage unit 422 and an interface 420, such as a program cartridge and cartridge interface, a removable memory (for example, a flash memory or other removable memory module) and memory slot, and other removable storage units 422 and interfaces 420 that allow software and data to be transferred from the removable storage unit 418 to computing system 400.

Computing system 400 can also include a communications interface 424.

Communications interface 424 can be used to allow software and data to be transferred between computing system 400 and external devices. Examples of communications interface 424 can include a modem, a network interface (such as an Ethernet or other NIC card), a communications port (such as for example, a universal serial bus (USB) port), a PCMCIA slot and card, etc. Software and data transferred via communications interface 424 are in the form of signals which can be electronic, electromagnetic, and optical or other signals capable of being received by communications interface 424. These signals are provided to communications interface 424 via a channel 428. This channel 428 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 408, storage device 418, or storage unit 422. These and other forms of computer-readable media may store one or more instructions for use by processor 404, to cause the processor to perform specified operations. Such instructions, generally referred to as 'computer program code' (which may be grouped in the form of computer programs or other groupings), when executed, enable the computing system 400 to perform functions of embodiments of the present invention. Note that the code may directly cause the processor to perform specified operations, be compiled to do so, and/or be combined with other software, hardware, and/or firmware elements (e.g. libraries for performing standard functions) to do so.

As used herein, the expression non-transitory will be understood to refer to the non-ephemeral nature of the storage medium itself rather than to a notion of how long the stored information itself may persist in a stored state. Accordingly, memories that might otherwise be viewed, for example, as being volatile (such as many electronically-erasable programmable read-only memories (EPROM's) or random-access memories (RAM's)) are nevertheless to be viewed here as being "non-transitory" whereas a signal carrier in transit is to be considered "transitory" notwithstanding that the signal may remain in transit for a lengthy period of time. Specifically, a non-transitory computer program product may comprise one or more of a hard disk, a CD-ROM, an optical storage device, a magnetic storage device, a Read Only Memory, ROM, a Programmable Read Only Memory, PROM, an Erasable Programmable Read Only Memory EPROM, EPROM, an Electrically Erasable Programmable Read Only Memory, EEPROM, and a Flash memory.

In an embodiment where the elements are implemented using software, the software may be stored in a computer-readable medium and loaded into computing system 400 using, for example, removable storage drive 422, drive 412 or communications interface 424. The control module (in this example, software instructions or computer program code), when executed by the processor 404, causes the processor 404 to perform the functions of the invention as described herein.

Furthermore, the inventive concept can be applied to any signal processing circuit. It is further envisaged that, for example, a semiconductor manufacturer may employ the inventive concept in a design of a stand-alone device, such as a microcontroller, digital signal processor, or application-specific integrated circuit (ASIC) and/or any other sub-system element.

It will be appreciated that, for clarity purposes, the above description has described embodiments of the invention with reference to different functional units and processors. However, it will be apparent that any suitable distribution of functionality between different functional units or processors may be used without detracting from the invention. For example, functionality illustrated to be performed by the same processor or controller may be performed by separate processors or controllers. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved method and apparatus for geolocating a wireless communication unit have been described, wherein the aforementioned disadvantages with prior art arrangements have been substantially alleviated.

The invention claimed is:

1. A method comprising:
   receiving, by a device, measurement data for radio frequency (RF) signals between a wireless communication unit and at least one base transceiver station;
   calculating, by the device, an RF measurement based geolocation estimate for the wireless communication unit based on the measurement data; obtaining, by the device, geographical area data for at least two wireless coverage areas identifiable by the wireless communication unit; determining, by the device, a geolocation validation area based on the geographical area data for the at least two wireless coverage areas identifiable by the wireless communication unit, where determining the geolocation validation area includes:
   determining the geolocation validation area based on calculating an area of overlap of coverage areas for the at least two wireless coverage areas identifiable by the wireless communication unit; determining, by the device, whether the RF measurement based geolocation estimate is located outside the geolocation validation area; and deriving, by the device, a confidence factor for the RF measurement based geolocation estimate based on whether the RF measurement based geolocation estimate is located outside the geolocation validation area.

2. The method of claim 1, further comprising:
   refining the geolocation validation area using the measurement data for at least one wireless coverage area of the at least two wireless coverage areas identifiable by the wireless communication unit.

3. The method of claim 2, where receiving the measurement data includes receiving signal strength information from the wireless communication unit for the at least one wireless coverage area identifiable by the wireless communication unit, and
   where refining the geolocation validation area includes refining the geolocation validation area based on the signal strength information.

4. The method of claim 2, where receiving the measurement data includes receiving link quality information from the wireless communication unit for the at least one wireless coverage area identifiable by the wireless communication unit, and
   where refining the geolocation validation area includes refining the geolocation validation area based on the link quality information.

5. The method of claim 1, further comprising:
   receiving propagation delay information from the wireless communication unit for
   at least one wireless coverage area of the at least two wireless coverage areas identifiable by the wireless communication unit; estimating a distance between the wireless communication unit and the at least one wireless coverage area identifiable by the wireless communication unit; and refining the geolocation validation area for the wireless communication unit within the area of overlap based on the distance.

6. The method of claim 1, where the geographical area data for the at least two wireless coverage areas identifiable by the wireless communication unit comprises, for each of the least two wireless coverage areas: an indication of a geographical location representative of a central point within
   the wireless coverage area; and an indication of a radius of the wireless coverage area.

7. The method of claim 1, where the geographical area data for the at least two wireless coverage areas identifiable by the wireless communication unit is obtained from at least one third party database.

8. The method of claim 7, where the geographical area data for the at least two wireless coverage area identifiable by the wireless communication unit is obtained from at least one of: at least one publicly available on-line database; or at least one proprietary third party database.

9. The method of claim 1, where the geographical area data comprises at least one of:
   crowd-sourced coverage data;
   network planning/configuration data; or
   drive test data.

10. The method of claim 1, where calculating the RF measurement based geolocation estimate includes:
    deriving a probability density function for a location of the wireless communication unit from the measurement data and network configuration data; and
    calculating the RF measurement based geolocation estimated using the probability density function.

11. The method of claim 1, where the measurement data comprises at least one of:
    signal strength measurement data;
    link quality measurement data; or
    propagation delay measurement data.

12. The method of claim 1, further comprising:
    setting the confidence factor to comprise a first confidence value based on the RF measurement based geolocation estimate being determined to be located outside the geolocation validation area; and
    setting the confidence factor to comprise a second confidence value based on the RF measurement based geolocation estimate being determined to be located inside the geolocation validation area,
    the first confidence value being lower than the second confidence value.

13. The method of claim 12, further comprising:
    when the RF measurement based geolocation estimate is determined to be located outside the geolocation validation area, setting the confidence factor lower the further the RF measurement based geolocation estimate is located outside the geolocation validation area.

14. The method of claim 1, further comprising:
providing an indication of the confidence factor.

15. The method of claim 1, further comprising:
calculating a replacement RF measurement based geolocation estimate for the wireless communication unit, based on the geolocation validation area, when the confidence factor is below a predetermined confidence level.

16. The method of claim 1, where receiving the measurement data includes:
receiving the measurement data from the wireless communication unit as part of a periodic measurement reporting process.

17. A device comprising: one or more processors to:
receive measurement data for radio frequency (RF) signals between a wireless communication unit and at least one base transceiver station; calculate an RF measurement based geolocation estimate for the wireless communication unit based at least partly on the measurement data; obtain geographical area data for at least two wireless coverage areas identifiable by the wireless communication unit; determine a geolocation validation area based on the geographical area data for the at least two wireless coverage areas identifiable by the wireless communication unit, where the one or more processors, when determining the geolocation validation area, are to: determine the geolocation validation area based on calculating an area of overlap of coverage areas for the at least two wireless coverage areas identifiable by the wireless communication unit; determine whether the RF measurement based geolocation estimate is located outside the geolocation validation area; and derive a confidence factor for the RF measurement based geolocation estimate based on whether the RF measurement based geolocation estimate is located outside the geolocation validation area.

18. The device of claim 17, where the one or more processors are further to:
set the confidence factor to comprise a first confidence value based on the RF measurement based geolocation estimate being determined to be located outside the geolocation validation area, and
set the confidence factor to comprise a second confidence value based on the RF measurement based geolocation estimate being determined to be located inside the geolocation validation area,
the first confidence value being lower than the second confidence value.

19. The device of claim 17, where the geographical area data for the at least two wireless coverage areas identifiable by the wireless communication unit comprises, for each of the least two wireless coverage areas: an indication of a geographical location representative of a central point within the wireless coverage area; and an indication of a radius of the wireless coverage area.

20. One or more non-transitory computer-readable media storing instructions, the instructions comprising: one or more instructions that, when executed by a processor, cause the processor to: receive measurement data for radio frequency (RF) signals between a wireless communication unit and at least one base transceiver station; calculate an RF measurement based geolocation estimate for the wireless communication unit based on the measurement data; obtain geographical area data for at least one wireless coverage area identifiable by the wireless communication unit, the geographical area data for the at least one wireless coverage area identifiable by the wireless communication unit comprising, for each of the least one wireless coverage area: an indication of a geographical location representative of a central point within the wireless coverage area, and an indication of a radius of the wireless coverage area; determine a geolocation validation area based on the geographical area data for the at least one wireless coverage area identifiable by the wireless communication unit; determine whether the RF measurement based geolocation estimate is located outside the geolocation validation area; and derive a confidence factor for the RF measurement based geolocation estimate based on whether the RF measurement based geolocation estimate is determined to be located outside the geolocation validation area.

* * * * *